E. MELAUN.
YIELDING CLUTCH.
APPLICATION FILED OCT. 21, 1910.

1,068,801.

Patented July 29, 1913.

WITNESSES:
L. H. Brink
O. M. McLaughlin

INVENTOR.
Ernst Melaun
BY
V. H. Lockwood
ATTORNEY.

YIELDING CLUTCH.

1,068,801.  Specification of Letters Patent.  Patented July 29, 1913.

Application filed October 21, 1910. Serial No. 588,280.

*To all whom it may concern:*

Be it known that I, ERNST MELAUN, of Indianapolis, county of Marion, and State of Indiana, have invented a certain useful Yielding Clutch; and I do hereby declare that the following is a full, clear, and exact description thereof, reference being had to the accompanying drawings.

The object of this invention is to provide a yielding transmission or clutch mechanism for the transmission of power, which will absorb the shock of starting and stopping, so as to relieve the machinery therefrom and from the effects thereof. It may be applied to any type of transmission mechanism.

The nature of the invention will be understood from the accompanying drawings and the following description and claims.

Figure 1:
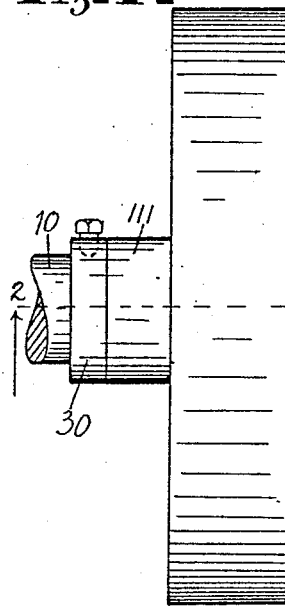
Figure 2:
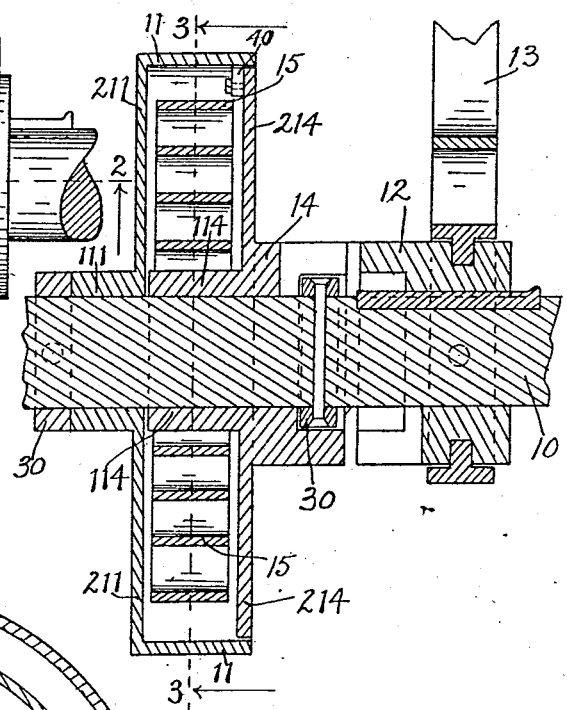
Figure 3:
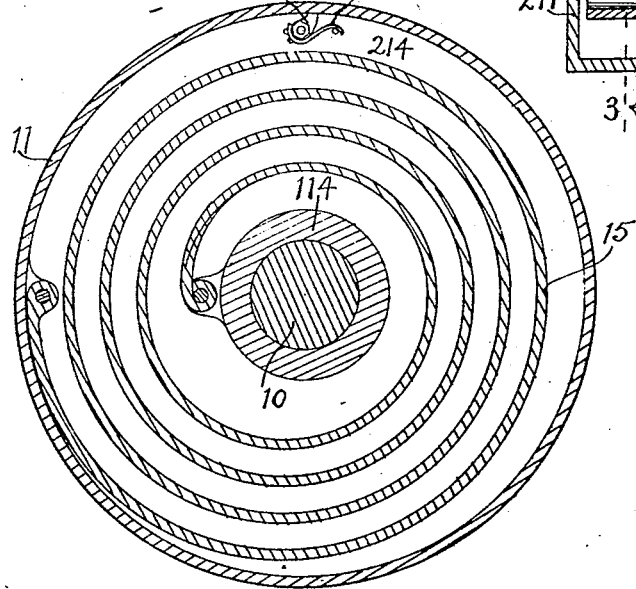

In the drawings Figure 1 is a plan view of a portion of a shaft and one form of power transmission mechanism. Fig. 2 is a section on the line 2—2 of Fig. 1. Fig. 3 is a section on the line 3—3 of Fig. 2.

There is shown herein a shaft 10, which may be either a driving or a driven shaft, and a pulley 11 loosely mounted thereon, which may also be a driving or a driven pulley, as I do not desire to limit the invention to any particular arrangement of the driving and driven members. There is also shown herein a clutch mechanism forming a part of the power transmission mechanism and consisting of a clutch member 12, slidable on the shaft 10 but rotatable therewith, and moved by the clutch lever 13 into or out of engagement with the clutch member 14. The clutching part of the construction is of ordinary type and may be modified or omitted, although if the clutch member 12 be omitted, the portion 14 would have to be mounted on the shaft, so as to revolve therewith. The parts 11 and 14 are both loosely mounted on the shaft 10 between collars 30 secured on the shaft. Between the members 11 and 14 a spring 15 is located so as to yieldingly transmit power from one of said members to the other member.

The chief feature of this invention relates to the parts 11 and 14 and the yielding means between them, regardless of how the other parts of the device may be constructed. The pulley 11 has a hub portion 111 and a disk portion 211 forming one side of the spring chamber and a peripheral portion on which the belt of the pulley runs. The other member 14 has a hub 114 loosely mounted on the shaft 10 and projecting within the pulley, and said member has also a disk 214 which projects out close to the periphery of the pulley.

A coiled metallic spring is secured at one end to the hub 114 of one member and at the other end to the periphery of the pulley member, as shown in Fig. 3. Hence, it is inclosed in the chamber between the periphery of the pulley and the disks 211 and 214.

If the shaft 10 be a driving shaft, when it is started, the initial movement of the member 14 will tend to tighten and coil the spring down around the hub and will gradually transmit power to and start the pulley so that the mechanism driven by the pulley will be gradually started and receive no severe shock as it would from the rapid starting of the same. On the other hand, if the pulley be a driving pulley, the initial movement will cause the spring to coil and tighten around on the hub 114 and to gradually start the member 14 and the shaft 10.

To lock the two members 11 and 14 together, if there should accidentally be a reversal of their movements, a locking pawl 40 is pivoted to the disk 214 and pushed by a spring 41 into engagement with the periphery of the pulley. Hence, when the parts are revolved in the wrong direction, these two members will lock together and the spring will not be injured.

The strength of the spring must be in proportion to the maximum power that may be transmitted and during the operation the action of the spring will automatically adjust itself to the strain put upon it and will wind on and off the hub 114, to some extent, as the power varies.

I claim as my invention:

1. Power transmission mechanism including a shaft, a pulley mounted loosely thereon, a clutch member loosely mounted on the shaft and separate from the pulley with a disk projecting toward the rim of the pulley to form a chamber between the pulley and the clutch member, a spring in said chamber and surrounding the shaft with one end of the spring secured to the hub of the clutch member and the other end to the rim of the pulley, means on one of said members for frictionally engaging the other member to resist backward movement of the pulley relative to the clutch member, and a second clutch member slidable along and rotatable with said shaft for coöperating with said first mentioned clutch member.

2. Power transmission mechanism including a shaft, a pulley mounted loosely thereon and formed of an outwardly extending hub portion, a disk on one side of the hub, a peripheral rim-like portion on said disk projecting in a direction away from the hub, a clutch member separate from the pulley and having a hub on said shaft and projecting into the pulley and a disk projecting from the hub toward the peripheral rim of the pulley so that the pulley and clutch member will form a chamber between them, a flat metallic spring within said chamber about the hub of said clutch member with one end of said spring secured to the hub of the clutch member and the other end secured to the rim of the pulley, a second clutch member slidable on the shaft, but rotatable therewith and adapted to engage and disengage said first-mentioned clutch member and a spring actuated pawl pivoted on the first mentioned clutch member and frictionally engaging the pulley for preventing its backward movement relative to the clutch member.

In witness whereof, I have hereunto affixed my signature in the presence of the witnesses herein named.

ERNST MELAUN.

Witnesses:
G. H. BOINK,
J. H. WELLS.

Copies of this patent may be obtained for five cents each, by addressing the "Commissioner of Patents, Washington, D. C."